United States Patent
Nishikawa

(10) Patent No.: US 9,344,780 B2
(45) Date of Patent: May 17, 2016

(54) COMMUNICATION CONTROL DEVICES AND METHOD

(71) Applicants: OF NETWORKS CO., LTD., Chiba (JP); Oki Electric Industry Co., Ltd., Tokyo (JP)

(72) Inventor: Takayuki Nishikawa, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 83 days.

(21) Appl. No.: 14/278,857

(22) Filed: May 15, 2014

(65) Prior Publication Data

US 2014/0355988 A1 Dec. 4, 2014

(30) Foreign Application Priority Data

May 28, 2013 (JP) ................................ 2013-112217

(51) Int. Cl.
*H04J 14/06* (2006.01)
*H04Q 11/00* (2006.01)

(52) U.S. Cl.
CPC ... *H04Q 11/0067* (2013.01); *H04Q 2011/0086* (2013.01)

(58) Field of Classification Search
CPC .... H04B 10/27; H04B 10/272; H04J 14/0221
See application file for complete search history.

(56) References Cited

U.S. PATENT DOCUMENTS

| | | | | |
|---|---|---|---|---|
| 2009/0067850 A1* | 3/2009 | Mizutani | ............... | H04J 3/0605 398/154 |
| 2011/0318008 A1* | 12/2011 | Kubo | ...................... | H04L 12/12 398/66 |
| 2012/0177361 A1* | 7/2012 | Hirano | ................. | H04B 10/272 398/1 |
| 2014/0193150 A1* | 7/2014 | Mukai | ..................... | H04L 12/44 398/67 |
| 2014/0226992 A1* | 8/2014 | Takahashi | ............... | H04L 12/12 398/155 |

FOREIGN PATENT DOCUMENTS

JP 2009-089323 A 4/2009

* cited by examiner

*Primary Examiner* — Dzung Tran
(74) *Attorney, Agent, or Firm* — Rabin & Berdo, P.C.

(57) ABSTRACT

There is provided a communication control device including a communication control processing portion that performs at least one type of communication control processing when a control signal that requests a response signal is received from a partner device, a transmission processing portion that transmits the response signal to the partner device after the processing that the communication control processing portion performs when the control signal is received from the partner device, a processing time measurement portion that measures time that is consumed by the processing by the communication control processing portion, and a processing content setting portion that, based on the measured processing time that has been measured by the processing time measurement portion and on a response processing time for the response to the control signal, sets content of processing that the communication control processing portion will be made to perform within the response processing time.

9 Claims, 12 Drawing Sheets

FIG. 6

| SESSION CUTOFF CAUSE VALUE | DESCRIPTION |
|---|---|
| 0 | SESSION CUTOFF DUE TO POWER SUPPLY CUTOFF |
| 1 | SESSION CUTOFF DUE TO PON LINK CUTOFF |
| 2 | SESSION CUTOFF DUE TO DEVICE FAILURE |
| 3 | SESSION CUTOFF DUE TO STARTING OF WATCHDOG TIMER |
| 4 | OTHER STARTING CAUSE |
| 5 | NO SESSION CUTOFF |

FIG. 7

| SESSION CUTOFF CAUSE VALUE | ELECTRIC POWER CONSERVATION FUNCTION DISABLED | | ELECTRIC POWER CONSERVATION FUNCTION ENABLED | | ELECTRIC POWER CONSERVATION FUNCTION DISABLED | | ELECTRIC POWER CONSERVATION FUNCTION ENABLED | |
|---|---|---|---|---|---|---|---|---|
| | DISTANCE EXTENSION FUNCTION DISABLED | | DISTANCE EXTENSION FUNCTION DISABLED | | DISTANCE EXTENSION FUNCTION ENABLED | | DISTANCE EXTENSION FUNCTION ENABLED | |
| 0 | 2 | | 3 | | 4 | | 5 | |
| 1 | 2 | | 3 | | 4 | | 5 | |
| 2 | 2 | | 2 | | 2 | | 2 | |
| 3 | 2 | | 2 | | 2 | | 2 | |
| 4 | 2 | | 3 | | 4 | | 5 | |

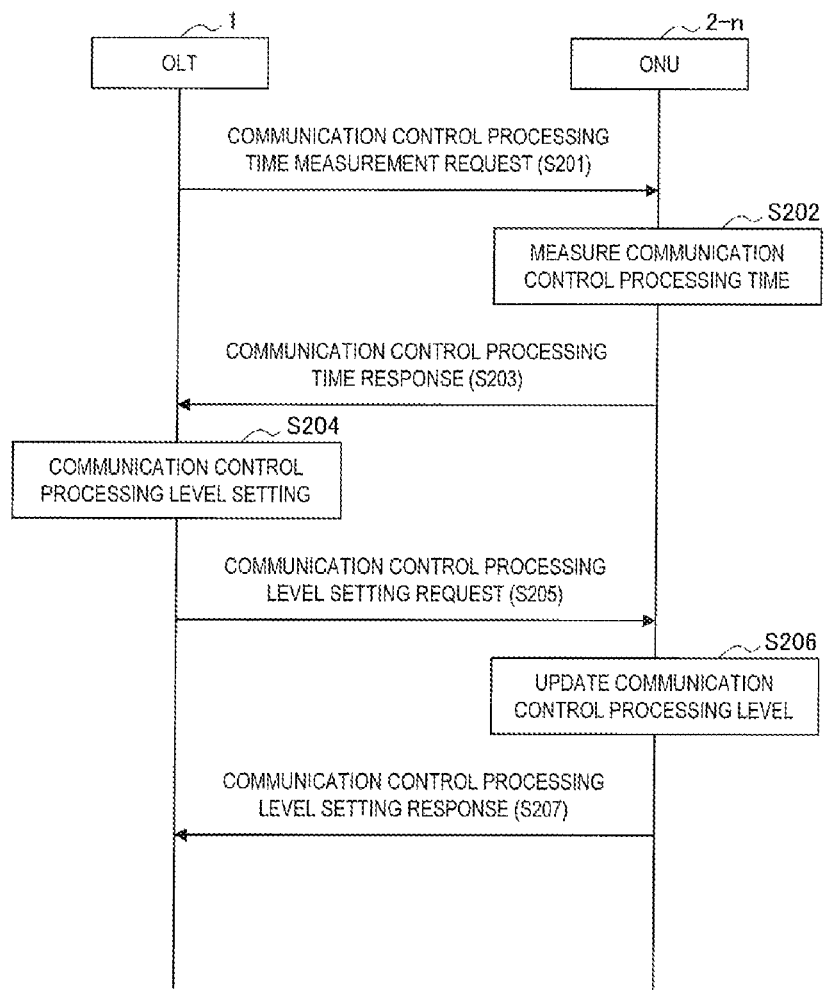

FIG. 12

| Field name | Octet |
|---|---|
| Destination MAC Address | 6byte |
| Source MAC Address | 6byte |
| 802.1Q Ether Type (WHERE VLAN TAG IS SET) | 2byte |
| 802.1Q tag (WHERE VLAN TAG IS SET) | 2byte |
| Ether Type | 2byte |
| MD level | (most significant 3bits) |
| Version | (least significant 5bits) |
| OpCode | 1byte |
| Flag | 1byte |
| First TLV offset | 1byte |
| Type = 31 (Organization Specific TLV) | 1byte |
| Length | 2byte |
| OUI | 3byte |
| Sub-Type | 1byte |
| Value(optional) | Length specified by the Length field |
| End of TLV | 2byte |
| FCS | 4byte |

COMMUNICATION CONTROL DEVICES AND METHOD

CROSS REFERENCE TO RELATED APPLICATION(S)

This application is based upon and claims benefit of priority from Japanese Patent Application No. 2013-112217, filed on May 28, 2013, the entire contents of which are incorporated herein by reference.

BACKGROUND

The present invention relates to a communication control device and method that can be applied, for example, to optical line termination devices that configure an optical communication network.

In recent years, fiber-to-the-home (FTTH) architecture that uses optical fiber as the transmission path has come to be widely used for providing high-speed, wide-area broadband service to private homes. A passive optical network (PON) is often used as an optical access system for providing broadband service by FTTH. For example, one optical access system is a gigabit Ethernet-passive optical network (GE-PON) system that uses gigabit Ethernet (registered trademark) as its PON technology.

GE-PON is a system for an optical communication network that conforms to the IEEE 802.3ah standard, and it is generally configured to have an optical line termination device (an optical line terminal (OLT)) on the provider side, an optical line termination device (an optical network unit (ONU)) on the user side, and an optical splitter.

In the communication processing by the ONU, first, the ONU receives a Multi-Point Control Protocol (MPCP) frame from the OLT. The ONU analyzes the MPCP frame and performs processing in accordance with the type of the frame. At this time, in a case where the MPCP frame is a GATE frame, it is necessary for the ONU to transmit an MPCP frame to the OLT.

Next the ONU performs a determination as to whether or not the GATE frame is a discovery GATE frame or a normal GATE frame. In a case where the GATE frame is a discovery GATE frame, as shown in FIG. 2, the ONU transmits a REGISTER_REQ frame to the OLT after waiting for a random delay time after a Grant #1 Start time (shown as "Grant Start" in FIG. 2).

On the other hand, in a case where the GATE frame is a normal GATE frame, the ONU transmits a REPORT frame in accordance with the Grant #1 Start time and a Grant #1 Length for the GATE frame.

At this time, the ONU communication control processing time (the ONU processing time) that is required for processing from the time when the ONU receives the MPCP frame until the ONU transmits an MPCP frame (the REGISTER_REQ frame or the REPORT frame) to the OLT is set to no longer than 16.384 microseconds, in accordance with IEEE 802.3ah.

It is conceivable that IEEE P1904.1 (Standard for Service Interoperability in Ethernet (registered trademark) Passive Optical Networks (SIEPON)) or the like might be introduced in the future in order to conserve electric power. If IEEE P1904.1 is introduced, it is conceivable that the amount of processing in the communication control processing in the ONU will increase and that the processing time for the communication control processing will increase, creating the possibility of communication delays and communication cutoffs between the OLT and the ONU.

It is also conceivable that the processing time that is demanded by the OLT will become even shorter, due to an increased number of branching points in the optical communication network and an increased distance between the OLT and the ONU. That is, if the time interval from when the ONU receives the GATE frame until the ONU transmits the Grant #1 Start time for the GATE frame to the OLT becomes shorter, it is possible that the ONU will be required to perform the communication control processing in a correspondingly shorter time.

SUMMARY

In order to avoid the increases in communication delays and the communication cutoffs that could result from the increased processing time for the communication control processing in the ONU in combination with the further shortening of the communication control processing time in the ONU, as described above, it is desirable for the duration of the communication control processing that is performed by the ONU to be measured, and for the communication control processing that is performed to be optimized.

However, known methods for measuring the communication control processing time in the ONU, such as using a measuring instrument like an oscilloscope or the like, for example, are extremely difficult. The reason for this is that the communication control processing time in the ONU is not always constant, but instead varies dynamically according to the content (for example, the number of Grants) in the GATE frame from the ONU and the content of the processing while communication control is being performed.

Therefore, a communication control device and a program are required that make it possible for monitoring and control of the communication control processing time in the ONU to be performed by the ONU itself or by the OLT.

According to an embodiment of the present disclosure, there is provided a communication control device, including (1) a receiving processing portion that receives a signal from a partner device, (2) a communication control processing portion that performs at least one type of communication control processing when a control signal that requests a response signal is received from the partner device, (3) a transmission processing portion that transmits the response signal to the partner device after the processing that the communication control processing portion performs when the control signal that requests the response signal is received from the partner device, (4) a processing time measurement portion that measures time that is consumed by the processing by the communication control processing portion, and (5) a processing content setting portion that, based on the measured processing time that has been measured by the processing time measurement portion and on a response processing time for the response to the control signal, sets content of processing that the communication control processing portion will be made to perform within the response processing time.

According to an embodiment of the present disclosure, there is provided a communication control program that causes a computer to function as (1) a receiving processing portion that receives a signal from a partner device, (2) a communication control processing portion that performs at least one type of communication control processing when a control signal that requests a response signal is received from the partner device, (3) a transmission processing portion that transmits the response signal to the partner device after the processing that the communication control processing portion performs when the control signal that requests the response signal is received from the partner device, (4) a processing time measurement portion that measures the time that is consumed by the processing by the communication control processing portion, and (5) a processing content setting portion that, based on the measured processing time that has been measured by the processing time measurement portion and on a response processing time for the response to the control signal, sets content of processing that the communication control processing portion will be made to perform within the response processing time.

According to an embodiment of the present disclosure, there is provided a communication control device, including (1) a processing time measurement request portion that transmits, to a partner device that has transmitted a control signal that requests a response signal, a measurement request signal that requests the time that is consumed by communication control processing in the partner device be measured, (2) a measured processing time acquisition portion that acquires information that includes the measured communication control processing time that the partner device has measured, (3) a processing content determination portion that, based on the measured processing time that has been acquired from the partner device and on a response processing time for the response to the control signal, determines content of processing that the partner device will be made to perform within the response processing time, and (4) a processing content setting request portion that transmits, to the partner device, information that includes the processing content that has been determined by the processing content determination portion.

According to an embodiment of the present disclosure, there is provided a communication control program that causes a computer to function as (1) a processing time measurement request portion that transmits, to a partner device to which a control signal has been transmitted, a measurement request signal that requests the time that is consumed by communication control processing in the partner device be measured, (2) a measured processing time acquisition portion that acquires information that includes the measured communication control processing time that the partner device has measured, (3) a processing content determination portion that, based on the measured processing time that has been acquired from the partner device and on a response processing time for the response to the control signal, determines content of processing that the partner device will be made to perform within the response processing time, and (4) a processing content setting request portion that transmits, to the partner device, information that includes the processing content that has been determined by the processing content determination portion.

According to the aspects of the present invention described above, for monitoring and control of the communication control processing time in the ONU can be performed by the ONU itself or by the OLT.

BRIEF DESCRIPTION OF THE DRAWINGS

FIG. 6 is an explanatory figure that explains session cutoff cause values according to the first embodiment;

FIG. 7 is a structural diagram that shows a structure of a communication control processing level setting table according to the first embodiment;

FIG. 11 is a sequence chart that shows the monitoring processing that monitors the communication control processing in the ONU in the second embodiment; and FIG. 12 is a structural diagram that shows a structure of an IEEE 802.1ag frame format.

DETAILED DESCRIPTION OF THE EMBODIMENT(S)

Figure 1:
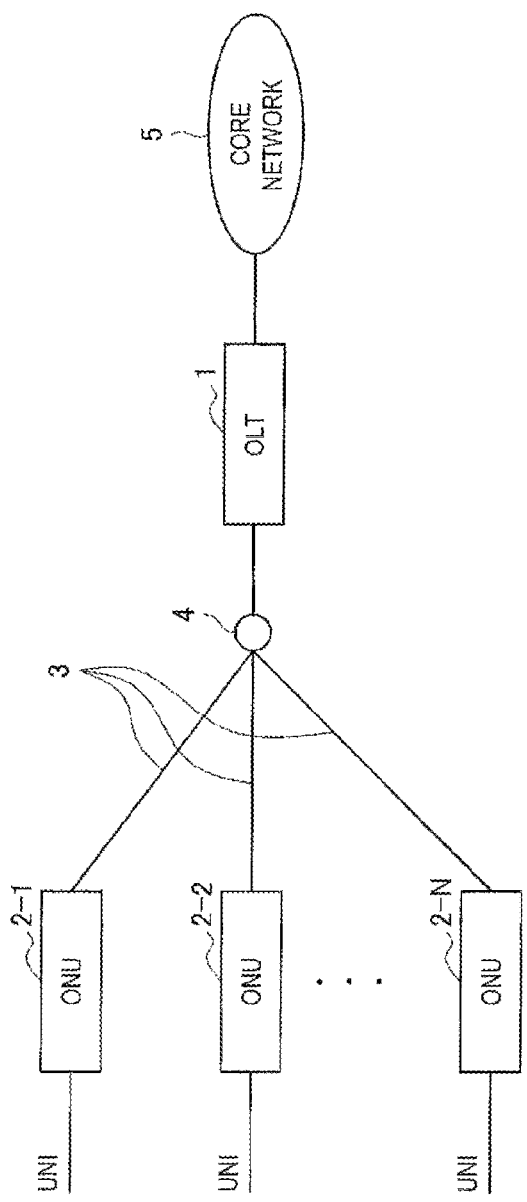
FIG. 1 is an overall configuration diagram that shows an overall configuration of an optical communication network according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

Hereinafter, a first embodiment of a communication control device and a program according to the present invention will be explained with reference to the drawings.

In the first embodiment, an example will be shown of a case in which the present invention is applied to an optical communication system (an optical communication network) that uses a GE-PON system, for example.

(A-1) Configuration of the First Embodiment
(A-1-1) Overall Configuration

FIG. 1 is an overall configuration diagram that shows an overall configuration of an optical communication network 10 according to the first embodiment. In FIG. 1, the optical communication network 10 includes an OLT 1, a plurality of ONUs 2-1 to 2-N, and an optical splitter 4.

The optical communication network 10 has a configuration in which the OLT 1 and the plurality of the ONUs 2-$n$ (1≤$n$≤N) are connected in a one-to-many relationship in which the optical splitter 4 is used to split a single optical fiber 3. An economical FTTH service can thus be provided by having a plurality of users share the optical fiber 3 and a transmission device.

Note that an example of the simplest network topology is shown in FIG. 1 in order to facilitate the explanation, but various types of configurations can be used for the network topology of the optical communication network 10. For example, the optical communication network 10 may also be provided with a plurality of the optical splitters 4 and may have a tree structure that makes it possible to have further branching into multiple levels.

The optical communication network 10 utilizes a wavelength-division multiplexing (WDM) system that uses different wavelengths for communication from the OLT 1 to the ONUs 2-*n* (download communication) and communication from the ONUs 2-*n* to the OLT 1 (upload communication). Furthermore, in order for the single optical fiber 3 to be shared by the plurality of the ONUs 2-*n*, the upload communication from the ONUs 2-*n* to the OLT 1 utilizes a time division multiple access (TDMA) system, for example to avoid collisions between upload communication signals.

The optical splitter 4 takes the download signals that are transmitted from the OLT 1 and distributes them to the ONUs 2-*n*, and also multiplexes the upload signals that are transmitted from the ONUs 2-*n* before forwarding them to the OLT 1. The optical splitter 4 is an example of a distributor/multiplexer.

The OLT 1 is an optical line termination device on the provider side, and in addition to being connected to the optical splitter 4 through the optical fiber 3, it is connected to a core network 5, which is a higher-order network. The OLT 1 has a control function called multi-point MAC control (MPCP) for performing TDMA control of access by the individual ONUs 2-*n*. Specifically, the OLT 1 implements MPCP control by transmitting and receiving MAC control frames to and from the individual ONUs 2-*n*.

Figure 2:
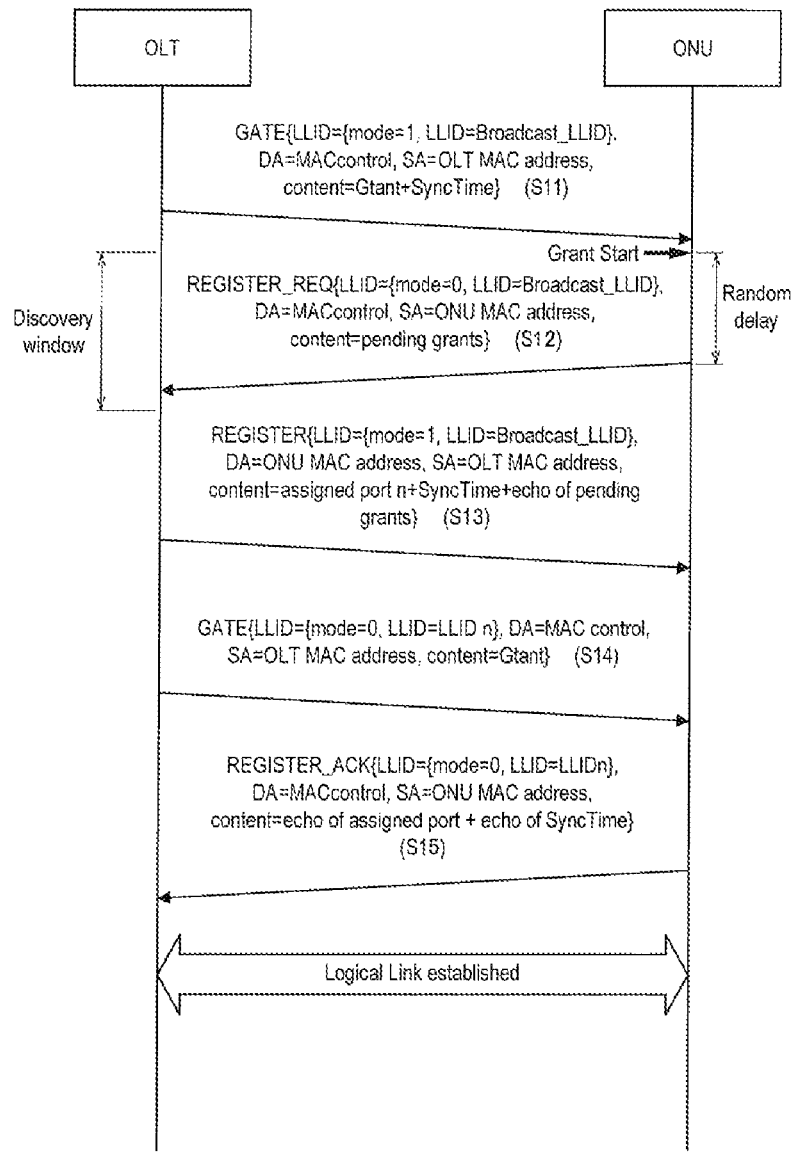
FIG. 2 is a sequence chart that shows (IEEE 802.3ah) processing for a discovery process.

Here, the OLT 1, prior to communicating with the individual ONUs 2-*n*, establishes communication links with the individual ONUs 2-*n* by executing a procedure called a discovery process. The discovery process procedure is shown by the sequence of procedures in FIG. 2. In the discovery process, the OLT 1 performs time synchronization among all of the ONUs 2-*n* in order to perform TDMA control.

After establishing the communication links, the OLT 1 receives REPORT frames that notify the OLT 1 of the amounts of data (transmission request amounts) that the individual ONUs 2-*n* will transmit. Based on the transmission request amounts for all of the ONUs 2-*n* that will request data transmission, the OLT 1 allocates a transmission bandwidth for upload communication to each one of the ONUs 2-*n*, then sends to each one of the ONUs 2-*n* a GATE frame that contains a permitted transmission amount (a Grant value) and a transmission start time for that ONU 2-*n*. Note that the method for the allocation of the transmission bandwidths by the OLT 1 (dynamic bandwidth allocation (DBA)) is not related to the present invention, so a detailed explanation will be omitted, but the bandwidth allocation method is not subject to any particular restrictions, and various types of methods can be broadly applied.

Each one of the ONUs 2-*n* is an optical line termination device on the user side, and along with being connected to the optical splitter 4 through the optical fiber 3, is connected to a user terminal (not shown in the drawings) through a User Network Interface (UNI). Note that any one of the ONUs 2-*n* may be connected to a single user terminal and may also be connected to a plurality of the user terminals.

Each one of the ONUs 2-*n* establishes a link with the OLT 1 by the discovery process with the OLT 1. The discovery process procedure is carried out by the sequence of procedures in FIG. 2, and when each one of the ONUs 2-*n* establishes the link with the OLT 1, the ONU 2-*n* uses the REPORT frame described above to notify the OLT 1 of its transmission request amount. Each one of the ONUs 2-*n* also analyzes the GATE frame that has been transmitted from the OLT 1, then, at the transmission start time that has been designated by the OLT 1, transmits transmission data (a data frame) of the permitted transmission amount.

In order to operate, control, and protect the communication link with the OLT 1, each one of the ONUs 2-*n* also transmits to and receives from the OLT 1, at fixed intervals (for example, one-second intervals), control frames that are called OAM frames.

(A-1-2) Internal Configuration of the ONU 2-*n*

Figure 3:
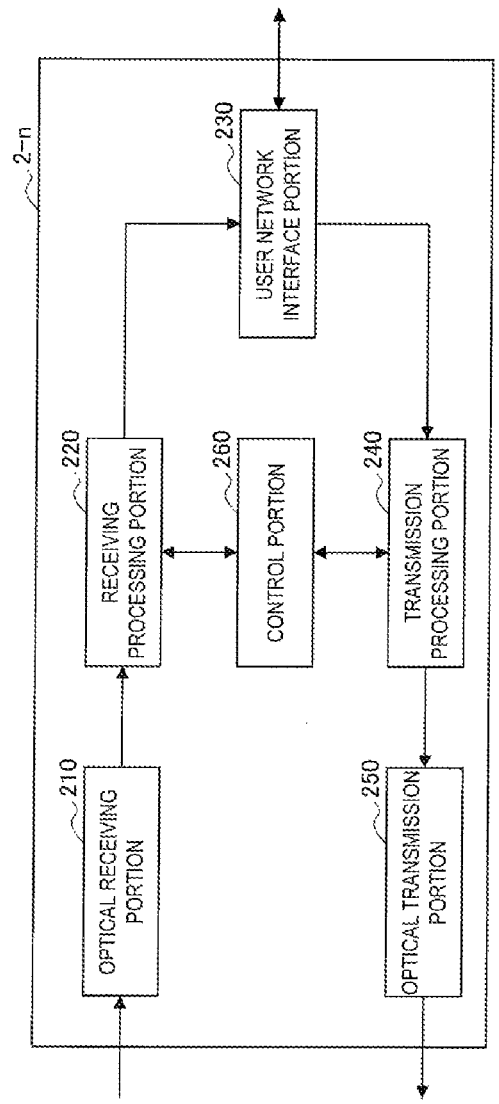
FIG. 3 is an internal configuration diagram that shows an internal configuration of an ONU in the first embodiment.

FIG. 3 is an internal configuration diagram that shows an internal configuration of the ONU 2-*n* in the first embodiment. In FIG. 3, the ONU 2-*n* in the first embodiment includes an optical receiving portion 210, a receiving processing portion 220, a user network interface portion 230, a transmission processing portion 240, an optical transmission portion 250, and a control portion 260.

The optical receiving portion 210 receives an optical signal from the optical fiber 3, converts the optical signal into an electrical signal, and provides the electrical signal to the receiving processing portion 220.

The receiving processing portion 220, under the control of the control portion 260, performs specified receiving processing on the signal it has received from the optical receiving portion 210. In some cases, the signal that the receiving processing portion 220 receives is a data signal from the OLT 1, and in other cases it is a control signal from the OLT 1.

The user network interface portion 230 is an interface portion that connects to the user terminal. The user network interface portion 230 receives a signal to the user terminal from the receiving processing portion 220, then transmits that signal to the user terminal, and also provides to the transmission processing portion 240 a signal that has been received from the user terminal.

The transmission processing portion 240, under the control of the control portion 260, performs specified transmission processing on the control signal and on the signals it has received from the user network interface portion 230.

The optical transmission portion 250 receives a transmission signal from the transmission processing portion 240, converts it into an optical signal, and transmits it to the optical fiber 3.

The control portion 260 controls the functions of the ONU 2-*n*. The control portion 260 includes a CPU, a ROM, a RAM, an EEPROM, an input/output interface portion, and the like, and the functions of the ONU 2-*n* are implemented by the executing, by the CPU, of a processing program that is stored in the ROM.

Figure 4:
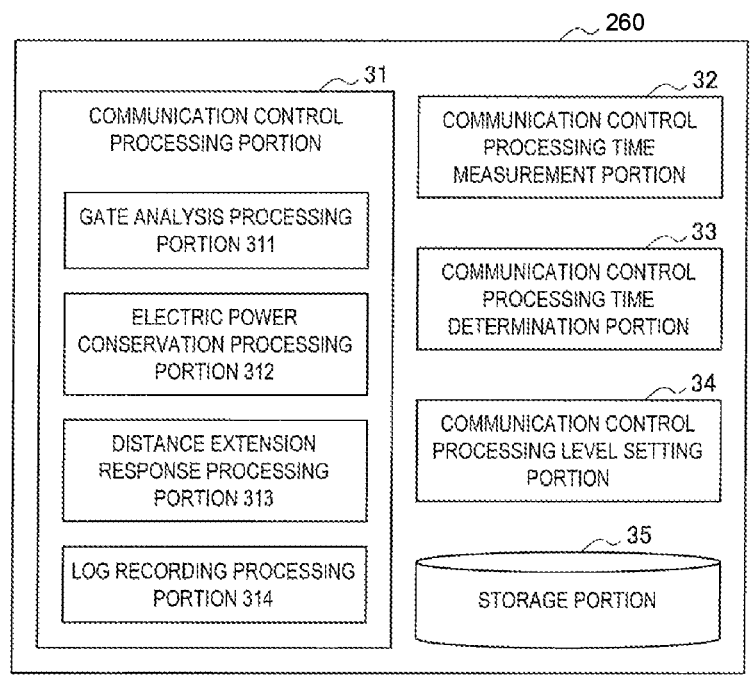
FIG. 4 is a functional block diagram that explains main functions of a control portion of the ONU in the first embodiment.

FIG. 4 is a functional block diagram that explains main functions of the control portion 260 of the ONU 2-*n* in the first embodiment.

As shown in FIG. 4, the control portion 260 of the ONU 2-*n* includes a communication control processing portion 31, a communication control processing time measurement portion 32, a communication control processing time determination portion 33, a communication control processing level setting portion 34, and a storage portion 35.

The communication control processing portion 31 performs communication control processing for the ONU 2-*n*. The communication control processing portion 31 performs the communication control processing on control signals to and from the OLT 1 and on data signals that have been received and data signals that will be transmitted.

Here, the processing that the communication control processing portion 31 performs can apply various types of the communication control processing in the ONU 2-*n*, such as GATE analysis processing, electric power conservation processing, distance extension response processing, log recording processing, and the like, for example. Of course, the processing that the communication control processing portion 31 performs is not limited to these types of processing, but in the first embodiment, in order to facilitate the explanation, the communication control processing portion 31 will be defined as performing the GATE analysis processing, the electric power conservation processing, the distance extension response processing, and the log recording processing.

The communication control processing portion 31 also performs the communication control processing in accordance with a communication control processing level value that has been set by the communication control processing level setting portion 34, which will be described later.

A GATE analysis processing portion 311 performs processing on the GATE frame that has been received from the OLT 1 when the discovery process is performed in conjunction with the OLT 1.

The GATE analysis processing portion 311 analyzes the control signal that has been received from the OLT 1, and in a case where the received control signal is a GATE frame, determines whether the GATE frame is a discovery GATE frame or a normal GATE frame.

In a case where the GATE frame is a discovery GATE frame, the GATE analysis processing portion 311 transmits a REGISTER_REQ frame to the OLT 1 after waiting for a random delay time after a Grant #1 Start time (Grant Start).

In a case where the GATE frame is a normal GATE frame, the GATE analysis processing portion 311 transmits a REPORT frame in accordance with the Grant #1 Start time and a Grant #1 Length for the GATE frame.

Note that the ONU 2-n communication control processing time (ONU processing time) that is required for processing from the time when the ONU 2-n receives the MPCP frame until the ONU 2-n transmits an MPCP frame (the REGISTER_REQ frame or the REPORT frame) is set to no longer than 16.384 microseconds, in accordance with IEEE 802.3ah.

An electric power conservation processing portion 312 performs the electric power conservation processing for transmission and receiving processing. The electric power conservation processing portion 312 can apply various types of electric power conservation processing, and specifically, it can apply the electric power conservation processing that is prescribed by IEEE P1904.1, for example.

A distance extension response processing portion 313 performs processing that responds to extension of the distance between the ONU 2-n and the OLT 1 (hereinafter also simply called extension).

A log recording processing portion 314 records information that pertains to the communication control processing in the ONU 2-n.

The communication control processing time measurement portion 32 measures the time during which the communication control processing portion 31 performs the communication control processing. In other words, the communication control processing time measurement portion 32 measures the communication control processing time for the communication control processing portion 31 while the communication control processing portion 31 is performing the communication control processing. The communication control processing time can thus be measured while the communication control processing is being performed, even though the communication control processing time can vary dynamically in accordance with the nature of the processing.

In this case, the communication control processing time is the time that is required for the communication control processing that the communication control processing portion 31 performs, but the communication control processing time measurement portion 32 measures, as the communication control processing time, the time from when a signal is received from another communication device until a signal is transmitted to the other communication device. For example, in a case where the OLT 1 transmits an MPCP frame to the ONU 2-n, the communication control processing time measurement portion 32 defines the communication control processing time as the time from when the MPCP frame from the OLT 1 was received until a response frame is transmitted in response to the MPCP frame.

The communication control processing time measurement portion 32 may also measure a plurality of the communication control processing times, store them in the storage portion 35, and compute an average value for the plurality of the communication control processing times.

The communication control processing time determination portion 33 takes the communication control processing time that has been derived by the communication control processing time measurement portion 32 and compares it to a threshold value. The threshold value may be, for example, 16.384 microseconds, which is the standard reference value in IEEE 802.3ah. The ONU 2-n is thus able to determine whether its communication control processing was performed within the 16.384 microseconds that is the standard reference value in IEEE 802.3ah or whether it was performed for a longer time.

The communication control processing time determination portion 33 may also take the processing times for the individual types of processing that the communication control processing portion 31 performs and compare them to threshold values that correspond to the respective types of processing. For example, the communication control processing time determination portion 33 may store the various types of processing times, such as X microseconds for the electric power conservation processing, Y microseconds for the distance extension response processing, Z microseconds for the log recording processing, and the like, compare them to the threshold values that correspond to the respective types of processing times. The various types of processing times can thus be determined to be longer or shorter than the respective threshold values.

The communication control processing level setting portion 34 sets a communication control processing level that indicates the type of the communication control processing that the communication control processing portion 31 will perform. The method by which the communication control processing level setting portion 34 sets the communication control processing level will be explained in detail when the operation of the first embodiment is explained.

The storage portion 35 stores the communication control processing times that have been derived by the communication control processing time measurement portion 32, the individual threshold values that are compared to the communication control processing times, the communication control processing level that has been set by the communication control processing level setting portion 34, information that is necessary for making that setting, and the like. A volatile memory, a non-volatile memory, or the like can be used for the storage portion 35.

(A-2) Operation of the First Embodiment

Hereinafter, an operation that monitors the communication control processing of the ONU 2-n in the first embodiment will be explained in detail with reference to the drawings.

Figure 5:
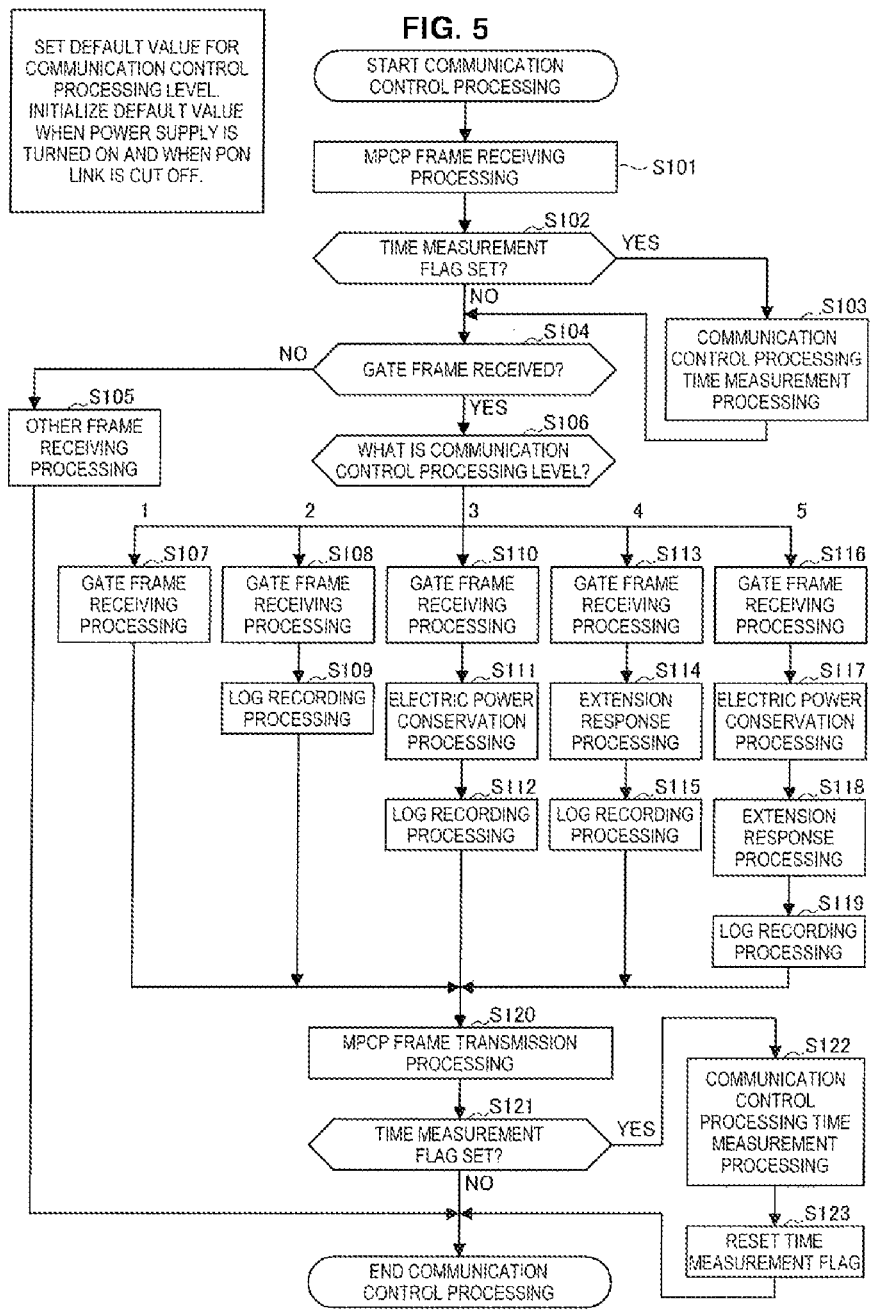
FIG. 5 is a flowchart that shows an operation of monitoring processing that monitors communication control processing in the ONU in the first embodiment.

FIG. 5 is a flowchart that shows the operation of processing that monitors the communication control processing in the ONU 2-n in the first embodiment.

Here, a time measurement flag is set in the ONU 2-n when the processing time for the communication control processing in the ONU 2-n is measured. Here, the time measurement flag is set when the power supply to the ONU 2-n is turned on, when a shutdown of the PON link occurs, or the like, for example. However, the time measurement flag may also be set at a specified time interval.

When the optical signal from the OLT 1 is provided to the ONU 2-*n*, the optical receiving portion 210 of the ONU 2-*n* converts the optical signal into an electrical signal and provides the electrical signal to the receiving processing portion 220. When the control portion 260 receives the received signal, it starts the communication control processing.

The control portion 260 checks whether or not the received signal contains an MPCP frame. In a case where the received signal contains an MPCP frame, the communication control processing portion 31 performs processing that corresponds to the received MPCP frame (Step S101).

At this time, the communication control processing time measurement portion 32 determines whether or not the time measurement flag has been set (Step S102). In a case where the time measurement flag has been set, the communication control processing time measurement portion 32 measures the time when the MPCP frame was received (Step S103). The communication control processing time measurement portion 32 stores the measured MPCP frame receiving time temporarily in a volatile memory or the like, for example. Note that in a case where the time measurement flag has not been set, the control portion 260 advances the processing to Step S104.

Next, the GATE analysis processing portion 311 of the communication control processing portion 31 determines whether or not the received MPCP frame is a GATE frame (Step S104). In a case where the received MPCP frame is not a GATE frame, the control portion 260 performs processing that corresponds to the received MPCP frame (Step S105), then terminates the communication control processing.

In a case where the received MPCP frame is a GATE frame, the communication control processing portion 31 checks the communication control processing level that has been set by the communication control processing level setting portion 34 (Step S106), then performs the communication control processing that corresponds to the communication control processing level (Steps S107 to S119).

In this case, the communication control processing level is identification information that indicates the type of the communication control processing that the communication control processing portion 31 will perform.

For example, the communication control processing level "1" indicates that only GATE frame receiving processing will be performed during the communication control processing. Accordingly, in a case where the communication control processing level is "1", the communication control processing portion 31 performs only the GATE frame receiving processing (Step S107) as the communication control processing that corresponds to the current received GATE frame.

Furthermore, in a case where the communication control processing level is "2", for example, the communication control processing portion 31 performs the GATE frame receiving processing (Step S108) and the log recording processing (Step S109). In a case where the communication control processing level is "3", the communication control processing portion 31 performs the GATE frame receiving processing (Step S110), the electric power conservation processing (Step S111), and the log recording processing (Step S112). In a case where the communication control processing level is "4", the communication control processing portion 31 performs the GATE frame receiving processing (Step S113), the distance extension response processing (Step S114), and the log recording processing (Step S115). In a case where the communication control processing level is "5", the communication control processing portion 31 performs the GATE frame receiving processing (Step S116), the electric power conservation processing (Step S117), the distance extension response processing (Step S118), and the log recording processing (Step S119).

When initialization is performed, the communication control processing level setting portion 34 sets a specified communication control processing level as an initial value (a default value). Initialization is performed when the power supply is turned on, when the PON link is cut off, and the like, for example. Accordingly, when initialization is performed when the power supply is turned on or the like, the communication control processing portion 31 performs the communication control processing that corresponds to communication control processing level that is the initial value.

When the communication control processing portion 31 performs the communication control processing for the received MPCP frame, the control portion 260 generates a response frame (an MPCP frame) for the received MPCP frame, and the ONU 2-*n* transmits the generated MPCP frame to the OLT 1 (Step S120).

At this time, the communication control processing time measurement portion 32 checks whether or not the time measurement flag has been set (Step S121). Note that in a case where the time measurement flag has not been set, the control portion 260 terminates the communication control processing.

In a case where the time measurement flag has been set, the communication control processing time measurement portion 32 measures the time when the transmitted MPCP frame was transmitted (Step S122), and stores the measured MPCP frame transmission time in the storage portion 35. The control portion 260 then resets the time measurement flag (Step S123) and terminates the communication control processing.

Note that the timing of the resetting of the time measurement flag is not limited to any particular time, and it may also be done during the communication control processing in FIG. 5 or during ordinary processing, for example.

In this case, the communication control processing time measurement portion 32 measures the MPCP frame receiving time at Step S103 in FIG. 5 and measures the MPCP frame transmission time at Step S122 in FIG. 5. The communication control processing time measurement portion 32 is therefore able to measure the dynamically varying communication control processing time by calculating the difference between the MPCP frame transmission time and the MPCP frame receiving time.

A time resolution in nanosecond units is required for the measurement of the communication control processing time. That enables the communication control processing time measurement portion 32 to use a method that measures the communication control processing time by utilizing register values of a register that counts up in synchronization with the CPU clock. In other words, the communication control processing time measurement portion 32 stores the register values in the storage portion 35 as time information for the MPCP frame receiving time and time information for the MPCP frame transmission time.

Specifically, the CPU clock cycle may be 62.5 MHz, for example. In that case, the time of one CPU clock cycle is 16 nanoseconds (1÷62.5÷1,000,000). If the time information for the MPCP frame receiving time is 1000, and the time information for the MPCP frame transmission time is 2000, the communication control processing time is 16 microseconds ((2000−1000)×16 nanoseconds).

Note that in this case, it is preferable for the storage portion 35 that stores the register values to be a volatile memory with a high read/write speed.

In FIG. 5, in a case where the communication control processing level is "1", for example, the communication control processing portion 31 performs only the GATE frame receiving processing as the communication control processing for the current received MPCP frame. Therefore, the time that is spent on the communication control processing for the received MPCP frame is comparatively short.

In contrast, in a case where the communication control processing level is "5", for example, the communication control processing portion 31 performs the GATE frame receiving processing, the electric power conservation processing, the distance extension response processing, and the log recording processing. Therefore, the time that is spent on the communication control processing for the received MPCP frame is comparatively long.

As the number of the communication control processing functions of the ONU 2-n increases, if the communication control processing is performed for all of the functions, the communication control processing time becomes longer. In cases such as when the device is started, restarted, or the like, the discovery process is performed, but it is necessary for the time from when the MPCP frame is received until the MPCP frame is transmitted to be no longer than the standard reference value (16.384 microseconds).

Accordingly, in a case where it has been determined that the communication control processing time is longer than the standard reference value, based on the communication control processing time during the communication control processing that the communication control processing time measurement portion 32 has measured, the communication control processing level setting portion 34 changes the communication control processing level to eliminate steps (for example, the electric power conservation processing, the distance extension response processing, the log recording processing, and the like) from the communication control processing.

In contrast, in a case where it has been determined that the communication control processing time is not longer than the standard reference value, the communication control processing level setting portion 34 operates as usual, without changing the communication control processing level and without eliminating any steps.

The processing during the performing of communication control can thus be optimized in accordance with the communication control processing time, making it possible to limit the occurrence of communication delays and communication cutoffs between the OLT 1 and the ONU 2-n. Furthermore, in a case where a communication delay or a communication cutoff does occur between the OLT 1 and the ONU 2-n, recovery from the communication delay or a communication cutoff can be facilitated by reducing the communication control processing to a minimum.

Specifically, operations such as the examples hereinafter described can be used.

The communication control processing time determination portion 33 compares the measured communication control processing time to a threshold value (for example, the 16.384 microseconds that is the standard reference value) and determines whether or not the communication control processing for the communication control processing level will be performed within the 16.384 microseconds that is the standard reference value.

In a case where it has been determined by the communication control processing time determination portion 33 that the communication control processing time for the current communication control processing level exceeds the threshold value (for example, the standard reference value), the communication control processing level setting portion 34 changes the communication control processing level.

Various types of methods for setting the communication control processing level can be broadly applied, as long as the method sets the level such that the communication control processing time will be no longer than the threshold value.

For example, if the value of the communication control processing level is reduced, the communication control processing time will become shorter, as in the example in FIG. 5. Accordingly, in a case where, at the current value of the communication control processing level, the communication control processing time will exceed the threshold value, a method can be used in which the communication control processing level setting portion 34 reduces the value of the communication control processing level by one level or a plurality of levels.

To take another example, assume that the session between the ONU 2-n and the OLT 1 is cut off due to an unintended event such as a power supply interruption or the like. In this case, it is necessary for the ONU 2-n to perform reconnection processing by performing the discovery process with the OLT 1. At this time, it is possible that the communication control processing time will exceed the threshold value (the standard reference value) due to the fact that a large number of ONUs 2-n that have communication control processing functions are all performing the communication control processing. In this sort of case, the communication control processing level setting portion 34 can employ a method that selects from among the GATE analysis processing, the log recording processing, the electric power conservation processing, and the distance extension response processing in a specified order of priority.

Specifically, the communication control processing level setting portion 34 determines the order of priority for the steps of the communication control processing based on the three factors that are listed below.

(1) Session cutoff cause value
(2) Electric power conservation function setting value (for example, "1" for enabled, "0" for disabled)
(3) Extension function setting value (for example, "1" for enabled, "0" for disabled)

The session cutoff cause value is a value that indicates the cause of the session cutoff in the ONU 2-n when a session with the OLT 1 has been cut off.

FIG. 6 is an explanatory figure that explains the session cutoff cause values according to the first embodiment. As shown in FIG. 6, for example, the session cutoff cause value "0" indicates "session cutoff due to power supply cutoff", "1" indicates "session cutoff due to PON link cutoff", "2" indicates "session cutoff due to device failure", "3" indicates "session cutoff due to starting of watchdog timer", "4" indicates "other starting cause", and "5" indicates "no session cutoff". The session cutoff cause value can be stored in the storage portion 35, which is one of a no-volatile memory and a volatile memory, and it is used when the communication control processing level is set.

For example, when the power supply is cut off, the control portion 260 can indicate that a power supply cutoff has occurred by initializing the session cutoff cause value to "0" when the device is started. Thereafter, when the communication control processing with a higher-order device has succeeded, the control portion 260 sets the session cutoff cause value to "5", indicating that the session is not cut off.

The electric power conservation function setting value is a value that sets whether a electric power conservation function of the ONU 2-n is enabled or not. In a case where the communication control processing portion 31 includes the electric power conservation processing portion 312, the electric power conservation function setting value is set to "1" indicating that the function is enabled, and in a case where the communication control processing portion 31 does not include the electric power conservation processing portion 312, the electric power conservation function setting value is set to "0" indicating that the function is disabled.

The extension function setting value is a value that sets whether a distance extension response function of the ONU 2-n is enabled or not. In a case where the communication control processing portion 31 includes the distance extension response processing portion 313, the extension function setting value is set to "1" indicating that the function is enabled, and in a case where the communication control processing portion 31 does not include the distance extension response processing portion 313, the extension function setting value is set to "0" indicating that the function is disabled.

Based on the session cutoff cause value, the electric power conservation function setting value, and the extension function setting value, the communication control processing level setting portion 34 sets the communication control processing level by referring to a communication control processing level setting table.

FIG. 7 is a structural diagram that shows a structure of the communication control processing level setting table according to the first embodiment.

As shown in FIG. 7, the communication control processing level setting table is used to determine the communication control processing level according to the session cutoff cause value and a combination of the electric power conservation function setting value and the extension function setting value. Note that the values in the communication control processing level setting table are examples. Therefore, they can be modified as desired. The method for modifying the values may be such that they can be modified by a command from a console.

For example, in a case where the session cutoff cause value is "1", the electric power conservation function setting value is "1" (enabled), and the extension function setting value is "1" (enabled), the communication control processing level setting portion 34 refers to the communication control processing level setting table in FIG. 7 and sets the communication control processing level value to "5".

To take another example, in a case where the session cutoff cause value is "2", the electric power conservation function setting value is "1" (enabled), and the extension function setting value is "1" (enabled), the communication control processing level setting portion 34 refers to the communication control processing level setting table in FIG. 7 and sets the communication control processing level value to "2".

Here, it is preferable for the setting and changing of the communication control processing level to be performed during the ordinary processing by the ONU 2-n. For example, instead of being performed during the communication control processing, the setting and changing of the communication control processing level may be performed at any desired time during the ordinary processing after the ONU 2-n is booted up (for example, during the initialization processing after the power supply is turned on, during the initialization processing after the PON link has been cut off, at regular intervals, or the like). Thus, during the communication control processing, the communication control processing portion 31 will only need to load the value that has been set for the communication control processing level.

The value for the communication control processing level that has been set by the communication control processing level setting portion 34 is stored in the storage portion 35, which is one of a non-volatile memory and a volatile memory. At this time, to the extent possible, it is preferable for the value to be stored in a memory (the storage portion 35) for which the read access speed is high. The reason for that is that when the GATE frame is received, as shown at Step S106 in FIG. 5, it is necessary for the communication control processing portion 31 to read the communication control processing level value and perform the communication control processing promptly.

(A-3) Effect of the First Embodiment

According to the first embodiment, as described above, the ONU 2-n itself measures the communication control processing time and can determine the type of the communication control processing that it will perform in accordance with the measurement result. Therefore, optimization can be performed during the communication control processing.

(B) Second Embodiment

Next, a second embodiment of the communication control device and the program according to the present invention will be explained in detail with reference to the drawings.

(B-1) Configuration of the Second Embodiment

In the first embodiment, a case was explained in which the ONU 2-n itself measures the communication control processing time and the ONU 2-n itself sets the communication control processing level value based on the measurement result.

In contrast to this, in the second embodiment, the ONU 2-n measures the communication control processing time in accordance with a command from the OLT 1, and the OLT 1 determines the value of the communication control processing level based on the communication control processing time that has been measured by the ONU 2-n, then issues a command to the ONU 2-n to set the level.

In the second embodiment, the overall configuration of the optical communication network is the same as in the first embodiment, so it will be explained using FIG. 1.

Figure 8:
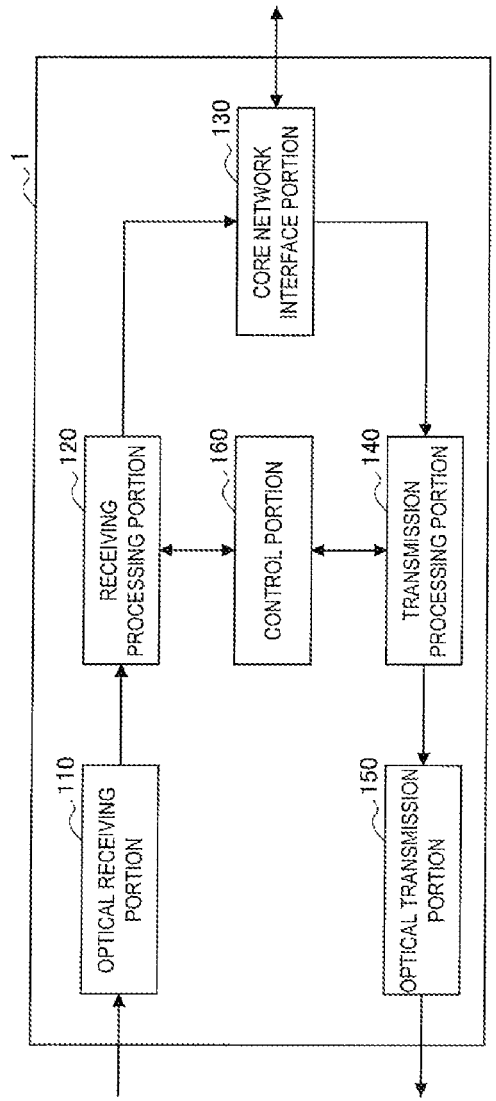
FIG. 8 is an internal configuration diagram that shows an internal configuration of an OLT in a second embodiment.

FIG. 8 is an internal configuration diagram that shows an internal configuration of the OLT 1 in the second embodiment.

In FIG. 8, the OLT 1 in the second embodiment includes an optical receiving portion 110 that converts a received optical signal into an electrical signal, a receiving processing portion 120 that performs specified receiving processing under the control of a control portion 160, a core network interface portion 130 that exchanges information with the core network, a transmission processing portion 140 that performs specified transmission processing under the control of the control portion 160, an optical transmission portion 150 that converts an electrical signal into an optical signal and transmits the optical signal, and the control portion 160, which controls the communication processing with the ONUs 2-n.

Note that the OLT 1 performs optical communications with the plurality of the ONUs 2-n through the optical fiber 3. Therefore, the control portion 160 may control all of the communication processing for the individual ONUs 2-n.

Figure 9:
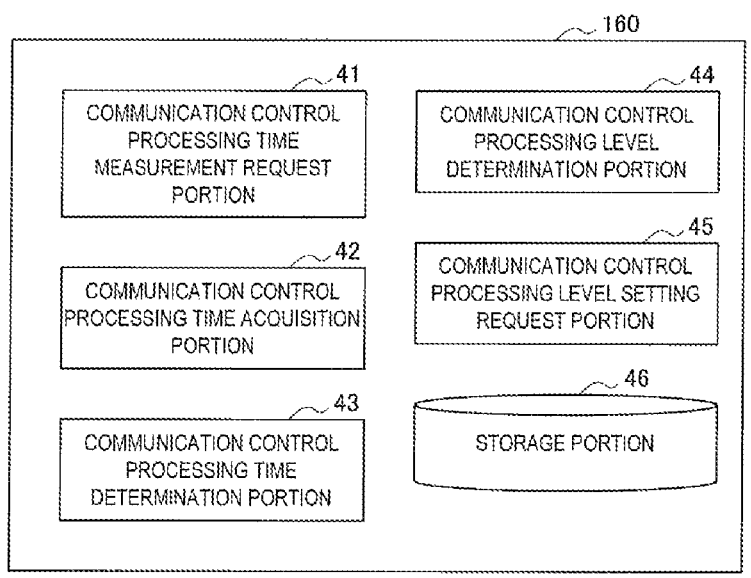
FIG. 9 is a functional block diagram that explains main functions of a control portion of the OLT in the second embodiment.

FIG. 9 is a functional block diagram that explains main functions of the control portion 160 of the OLT 1 in the second embodiment.

As shown in FIG. 9, the control portion 160 of the OLT 1 includes a communication control processing time measurement request portion 41, a communication control processing time acquisition portion 42, a communication control processing time determination portion 43, a communication control processing level determination portion 44, a communication control processing level setting request portion 45, and a storage portion 46.

The communication control processing time measurement request portion 41 issues a request to the ONU 2-*n* to measure the communication control processing time.

The communication control processing time acquisition portion 42 acquires the communication control processing time that has been measured by the ONU 2-*n*.

The communication control processing time determination portion 43 takes the communication control processing time that has been acquired by the communication control processing time acquisition portion 42 and compares it to a threshold value (for example, the standard reference value).

The communication control processing level determination portion 44 determines the communication control processing level value in the ONU 2-*n* based on the result of the determination by the communication control processing time determination portion 43. The communication control processing level determination portion 44 also adjusts the length of the communication control processing time (the standard reference value) in the ONU 2-*n*, based on a communication control processing time that has been acquired from the ONU 2-*n*.

The communication control processing level setting request portion 45 issues a request to the ONU 2-*n* to set its communication control processing level to the value that has been determined by the communication control processing level determination portion 44 and/or issues a request to the ONU 2-*n* to sets its communication control processing time to the value to which the communication control processing time for that ONU 2-*n* has been adjusted by the communication control processing level determination portion 44.

The storage portion 46 stores the communication control processing times for the individual ONUs 2-*n* that have been acquired by the communication control processing time acquisition portion 42, the threshold values to which the communication control processing times are compared, the communication control processing levels that the communication control processing level determination portion 44 has determined, information that is necessary for making those settings, and the like. The storage portion 56 can use a volatile memory, a non-volatile memory, or the like.

Figure 10:
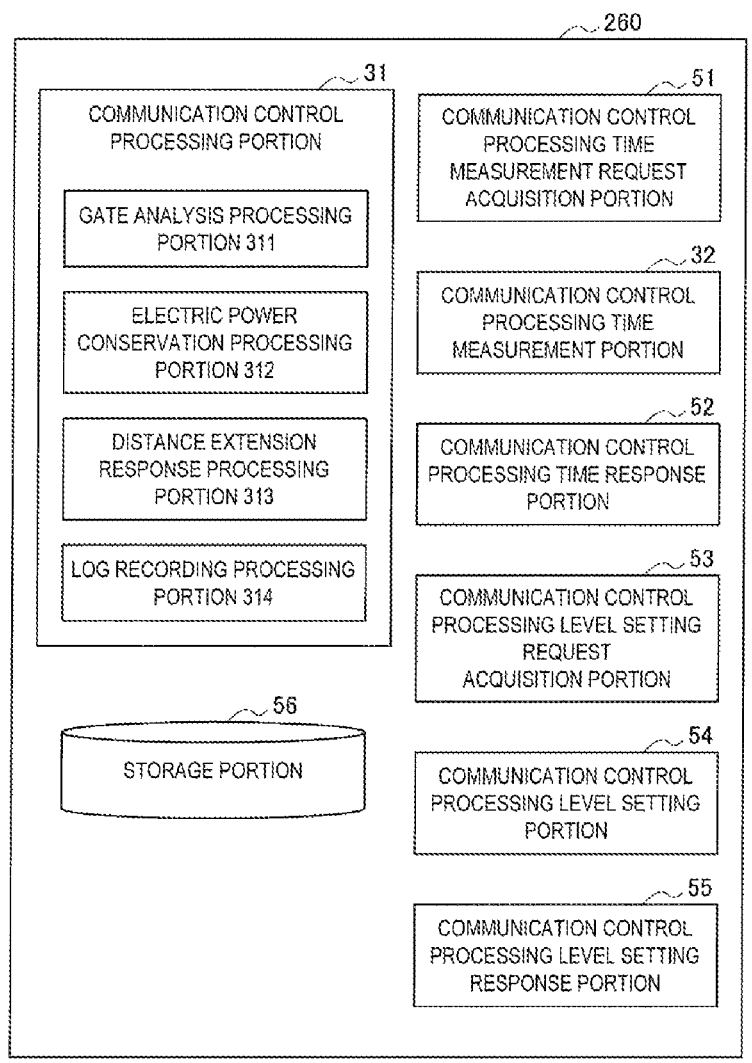
FIG. 10 is a functional block diagram that explains main functions of the control portion of the ONU in the second embodiment.

FIG. 10 is a functional block diagram that explains main functions of the control portion 260 of the ONU 2-*n* in the second embodiment.

As shown in FIG. 10, the control portion 260 of the ONU 2-*n* includes the communication control processing portion 31, a communication control processing time measurement request acquisition portion 51, the communication control processing time measurement portion 32, a communication control processing time response portion 52, a communication control processing level setting request acquisition portion 53, a communication control processing level setting portion 54, a communication control processing level setting response portion 55, and a storage portion 56.

In the same manner as in the first embodiment, the communication control processing portion 31 performs the communication control processing for the ONU 2-*n*, and the type of the communication control processing is not particularly restricted. In the second embodiment, an example will be shown of a case in which the communication control processing portion 31 includes the GATE analysis processing portion 311, the electric power conservation processing portion 312, the distance extension response processing portion 313, and the log recording processing portion 314.

The communication control processing portion 31 also performs the communication control processing in accordance with the communication control processing level value that has been set by the communication control processing level setting portion 34, which will be described later.

The communication control processing time measurement request acquisition portion 51 acquires the communication control processing time measurement request from the OLT 1.

Upon being provided with the communication control processing time measurement request, the communication control processing time measurement portion 32 measures the time that is consumed by the ONU 2-*n*'s communication control processing.

Here, the method for measuring the communication control processing time can be the same method that is used in the first embodiment, in which the time when the MPCP frame is received from the OLT 1 and the time when the MPCP frame is transmitted to the OLT 1 are measured.

The communication control processing time response portion 52 responds by transmitting the communication control processing time to the OLT 1.

Note that in the second embodiment, a case in which the communication control processing time is measured when the communication control processing time measurement request is received will be shown as an example, but the communication control processing time measurement portion 32 may also measure the communication control processing time in advance and transmit to the OLT 1 the communication control processing time that was measured in advance.

The communication control processing level setting request acquisition portion 53 acquires the communication control processing level setting request from the OLT 1.

When the communication control processing level setting request has been acquired, the communication control processing level setting portion 54 sets the communication control processing level value that has been acquired from the OLT 1 by storing it in the storage portion 56. The communication control processing portion 31 thus performs the communication control processing in accordance with the communication control processing level value that was set by the OLT 1.

The communication control processing level setting response portion 55 issues a response that responds to the communication control processing level setting request from the OLT 1.

The storage portion 56 stores the communication control processing level value that is set by the communication control processing level setting portion 54, information that is necessary for making that setting, and the like. The storage portion 56 can use a volatile memory, a non-volatile memory, or the like.

(B-2) Operation of the Second Embodiment

Next, an operation that monitors the communication control processing of the ONU 2-*n* in the second embodiment will be explained in detail with reference to the drawings.

FIG. 11 is a sequence chart that shows the monitoring processing that monitors the communication control processing in the ONU 2-*n* in the second embodiment.

First, in the OLT 1, the communication control processing time measurement request portion 41 transmits a communication control processing time measurement request signal to the ONU 2-*n* (Step S201). In the same manner as in the first embodiment, the timing of the measurement of the communication control processing time can be defined as the time when the ONU 2-n device is started, the time when reconnection is made after the session has been cut off, or the like.

Here, the exchanging of information that pertains to the communication control processing between the OLT 1 and the ONU 2-n can be performed using Ethernet (registered trademark) OAM, for example. The Ethernet (registered trademark) OAM system can use a standard specification technology such as ITU-T Y1731, IEEE 802.1ag, IEEE 802.3ah, or the like, as well as an original technology.

FIG. 12 is a structural diagram that shows a structure of an IEEE 802.1ag frame format. In the present embodiment, a case in which the IEEE 802.1ag OAM frame format is used for communication between the OLT 1 and the ONU 2-n will be shown as an example. For example, in a case where the OLT 1 issues the communication control processing time measurement request to the ONU 2-n, a value that indicates the communication control processing time measurement request is stored in the Sub-Type field of the frame format that is shown in FIG. 12, and a value that indicates one of GET Request and GET Response is stored in the Value field. Note that the Type field in FIG. 12 indicates a case in which the Type is defined as Organization Specific TLV, which is specific to the vendor.

In the ONU 2-n, when the communication control processing time measurement request signal is received from the OLT 1, the communication control processing time measurement portion 32 measures the communication control processing time (Step S202). The method that the communication control processing time measurement portion 32 uses for measuring the communication control processing time is the same as in the first embodiment, so a detailed explanation will be omitted here.

Next, the communication control processing time response portion 52 transmits a communication control processing time response signal to the OLT 1 (Step S203).

In the OLT 1, the communication control processing time determination portion 43 takes the communication control processing time that has been received from the ONU 2-n and compares it to the threshold value to determine whether or not the communication control processing time is not greater than the threshold value. Then, in a case where the communication control processing time in the ONU 2-n exceeds the threshold value, the communication control processing level determination portion 44 sets the value of the communication control processing level for the ONU 2-n (Step S204).

In the OLT 1, the communication control processing level setting request portion 45 transmits a setting request signal to the ONU 2-n that includes the communication control processing level value that was set by the communication control processing level determination portion 44 (Step S205).

In the ONU 2-n, when the communication control processing level setting request acquisition portion 53 acquires the communication control processing level setting request signal from the OLT 1, the communication control processing level setting portion 54 sets the communication control processing level value that has been acquired from the OLT 1 by storing it in the storage portion 56 (Step S206). Then the communication control processing level setting response portion 55 transmits a communication control processing level setting response signal to the OLT 1 (Step S207).

The OLT 1 thus determines the communication control processing level value for the ONU 2-n based on the communication control processing time that is acquired from the ONU 2-n. The ONU 2-n sets the communication control processing level to the value that it has received from the OLT 1 and notifies the OLT 1 that it has made the setting.

Setting the communication control processing level in this manner in the ONU 2-n makes it possible for the communication control processing portion 31 to perform the communication control processing in accordance with the communication control processing level value that was received from the OLT 1.

According to the second embodiment, the OLT 1 is able to know the communication control processing time for the ONU 2-n. The OLT 1 is also able to compute a setting limit value for the Grant Start time for the GATE frame.

The method for computing the setting limit value for the Grant Start time will now be explained.

The setting limit value for the Grant Start time is defined as t. The communication control processing time according to the current communication control processing level for the ONU 2-n is defined as T. The time for the optical signal to travel between the OLT 1 and the ONU 2-n is defined as $\Delta t$, and the time that is required until the OLT 1 transmits the GATE signal is defined as $\Delta u$.

At this time, the OLT 1 determines the setting limit value t for the Grant Start time based on Equation (1) below.

$$t = T + \Delta t + \Delta u \quad (1)$$

This makes it possible for the OLT 1 to set the Grant Start time to conform to the communication control processing time for the ONU 2-n.

As the Grant Start time becomes greater, the time interval from when the ONU 2-n receives the GATE frame until the ONU 2-n transmits the REPORT frame increases, so the communication control processing time for the ONU 2-n can increase to that extent.

Conversely, the Grant Start time can also become shorter. In that case, the ONU 2-n can return the REPORT frame to the OLT 1 more quickly than it has up to this point, so any communication delay between the OLT 1 and the ONU 2-n can be reduced.

(B-3) Effects of the Second Embodiment

According to the second embodiment, as described above, the same sort of effect as in the first embodiment can be demonstrated. Furthermore, according to the second embodiment, the OLT 1 is able to know the communication control processing time that is consumed by the communication control processing in each one of the ONUs 2-n, so the OLT 1 can adjust the Grant Start times.

(C) Other Embodiments (C-1) In the embodiments that are described above, a case in which the ONUs that make up the optical communication network monitor their own communication control processing times and a case in which the ONUs monitor their communication control processing times based on request signals from the OLT were shown as examples. However, the present invention can be applied broadly to any communication device that performs electrical communication processing.

(C-2) In the embodiments that are described above, a case in which the optical communication system uses the GE-PON system was shown as an example, but the present invention can also be broadly applied to other optical communication systems.

(C-3) In the second embodiment, a case was shown as an example in which the ONU measures the communication control processing time in response to a request from the OLT, the OLT determines the communication control processing level, and the ONU performs the communication control processing based on the communication control processing level value that is determined by the OLT. As a modified example of the second embodiment, the ONU may also measure the communication control processing time based on a request from the OLT, and the ONU itself may determine the communication control processing level based on the measurement result.

It should be understood by those skilled in the art that various modifications, combinations, sub-combinations and alterations may occur depending on design requirements and other factors insofar as they are within the scope of the appended claims or the equivalents thereof.

What is claimed is:

1. A communication control device, comprising:
   a receiving processing portion configured to receive a control signal from a partner device;
   a communication control processing portion configured to, upon receiving the control signal, perform communication control processing in accordance with a first one of a plurality of processing levels, each of which corresponds to a number of processing steps to be performed by the communication control processing portion, to thereby generate a response signal;
   a transmission processing portion configured to transmit the generated response signal to the partner device;
   a processing time measurement portion configured to measure a time that is consumed by the communication control processing portion for performing the communication control processing; and
   a processing level setting portion configured to compare the measured processing time with a predetermined response processing time, and to thereby select a second one of the plurality of processing levels for the communication control processing portion.

2. The communication control device according to claim 1, wherein
   the time measured by the processing time measurement portion is a time period between when the control signal is received and when the response signal is transmitted.

3. The communication control device according to claim 1, wherein the processing level setting portion
   upon detecting that the measured processing time exceeds the predetermined response processing time, selects one of the processing levels that corresponds to a smaller number of the processing steps than the first processing level as being the second processing level, and
   upon detecting that the measured processing time does not exceed the predetermined response processing time, continues to use the first processing level as the second processing level.

4. The communication control device according to claim 1, wherein
   the processing time measurement portion measures the time upon receipt of a processing time measurement request from the partner device.

5. A communication control device, comprising:
   a receiving processing portion that receives a signal from a partner device;
   a communication control processing portion that performs at least one type of communication control processing when a control signal that requests a response signal is received from the partner device;
   a transmission processing portion that transmits the response signal to the partner device after the processing that the communication control processing portion performs when the control signal that requests the response signal is received from the partner device;
   a processing time measurement portion that measures time that is consumed by the processing by the communication control processing portion; and
   a processing content setting portion that, based on the measured processing time that has been measured by the processing time measurement portion and on a response processing time for the response to the control signal, sets content of processing that the communication control processing portion will be made to perform within the response processing time, wherein
   the processing time measurement portion measures the time that is consumed by the processing by the communication control processing portion in a case where a processing time measurement request has been received from the partner device, and
   the processing content setting portion sets, as the content of the processing that the communication control processing portion will be made to perform within the response processing time, a type of the communication control processing that has been determined by the partner device.

6. A communication control method of a communication control device, comprising:
   receiving, by the communication control device, a control signal from a partner device;
   performing, responsive to the control signal communication control processing in accordance with a first one of a plurality of processing levels, each of which corresponds to a number of processing steps to be performed by the communication control device, to thereby generate a response signal;
   transmitting the generated response signal to the partner device;
   measuring a time that is consumed by the communication control processing; and
   comparing the measured processing time and a predetermined response processing time, and to thereby select a second one of the plurality of processing levels for the communication control processing portion.

7. A communication control device, comprising:
   a processing time measurement request portion configured to transmit, to a partner device to which a control signal has been transmitted, a measurement request signal that requests that a time that is consumed by communication control processing in the partner device be measured;
   a measured processing time acquisition portion configured to acquire the measured communication control processing time from the partner device;
   a processing level determination portion configured to compare the acquired measured communication control processing time with a predetermined response processing time, and to select one of the plurality of processing levels for the communication control processing in the partner device, each processing level corresponding to a number of processing steps to be performed for the communication control processing; and
   a processing level setting request portion configured to transmit, to the partner device, the selected processing level.

8. The communication control device according to claim 7, wherein
   the processing level determination portion adjusts a length of the response processing time based on the acquired measured communication control processing time.

9. A communication control method of a communication control device, comprising:

transmitting, to a partner device to which a control signal has been transmitted, a measurement request signal that requests that a time that is consumed by communication control processing in the partner device be measured;

acquiring the measured communication control processing time from the partner device;

comparing the acquired measured communication control processing time with a predetermined response processing time, and to select one of the plurality of processing levels for the communication control processing in the partner device, each processing level corresponding to a number of processing steps to be performed for the communication control processing; and transmitting the selected processing level to the partner device.

* * * * *